(12) United States Patent
Broeska et al.

(10) Patent No.: US 9,757,876 B2
(45) Date of Patent: Sep. 12, 2017

(54) METHOD FOR MAKING AN ARTICLE FROM A CURABLE MATERIAL

(75) Inventors: Sergei Douglas Broeska, Winnipeg (CA); Leon Fainstein, Winnipeg (CA)

(73) Assignee: Red River College, Winnipeg (CA)

( * ) Notice: Subject to any disclaimer, the term of this patent is extended or adjusted under 35 U.S.C. 154(b) by 250 days.

(21) Appl. No.: 14/381,574

(22) PCT Filed: Feb. 27, 2012

(86) PCT No.: PCT/CA2012/000174
§ 371 (c)(1),
(2), (4) Date: Mar. 4, 2015

(87) PCT Pub. No.: WO2013/126981
PCT Pub. Date: Sep. 6, 2013

(65) Prior Publication Data
US 2015/0165649 A1    Jun. 18, 2015

(51) Int. Cl.
*B29C 33/38*  (2006.01)
*B29C 33/52*  (2006.01)
*B29C 41/02*  (2006.01)
*B29C 41/42*  (2006.01)
*B29C 70/44*  (2006.01)
(Continued)

(52) U.S. Cl.
CPC .......... *B29C 33/3842* (2013.01); *B29C 33/52* (2013.01); *B29C 41/02* (2013.01); *B29C 41/42* (2013.01); *B29C 67/0081* (2013.01); *B29C 70/342* (2013.01); *B29C 70/44* (2013.01); *B29C 70/54* (2013.01); *B33Y 10/00* (2014.12); *C08J 5/24* (2013.01); *B29C 67/0059* (2013.01); *B29K 2105/0872* (2013.01); *B29K 2307/04* (2013.01); *B29K 2909/00* (2013.01); *B29L 2031/757* (2013.01); *B33Y 80/00* (2014.12)

(58) Field of Classification Search
CPC ....... B29C 70/342; B29C 41/42; B29C 70/44; B29C 67/0059; B29C 33/3842; B29C 70/54; B29C 67/0081; B29C 41/02; B29C 33/52; C08J 5/24; B29K 2909/00; B29K 2307/04; B29K 2105/0872; B29L 2031/757; B33Y 80/00; B33Y 10/00
See application file for complete search history.

(56) References Cited

U.S. PATENT DOCUMENTS

| 3,962,394 A * | 6/1976 | Hall ........................ B29C 53/56 156/285 |
| 2008/0182054 A1 * | 7/2008 | Ridges .................... B29C 70/30 428/35.2 |
| 2011/0000398 A1 * | 1/2011 | Wallen ................... B22F 1/0074 106/614 |

FOREIGN PATENT DOCUMENTS

WO    WO-2006/020279 A2    2/2006

OTHER PUBLICATIONS

Machine translated copy of JP 11-300839.*

* cited by examiner

*Primary Examiner* — Vishal I Patel
(74) *Attorney, Agent, or Firm* — Winstead PC

(57) ABSTRACT

The present disclosure is directed at a method for making an article from a curable material, such as pliable fibre-reinforced polymer. The method includes printing a dissolvable, three dimensional substructure using a substructure material; applying the curable material to the substructure; curing the curable material while it is on the substructure; and dissolving the substructure using a dissolving agent. Using a 3D printer to print the substructure allows for faster and more economical manufacture of composite articles, such as prototype parts, relative to conventional methods that utilize CNC machines.

16 Claims, 10 Drawing Sheets

(51) Int. Cl.
    *C08J 5/24*     (2006.01)
    *B33Y 10/00*     (2015.01)
    *B29C 70/34*     (2006.01)
    *B29C 70/54*     (2006.01)
    B29C 67/00     (2017.01)
    B33Y 80/00     (2015.01)
    B29K 105/08     (2006.01)
    B29K 307/04     (2006.01)
    B29L 31/00     (2006.01)

METHOD FOR MAKING AN ARTICLE FROM A CURABLE MATERIAL

TECHNICAL FIELD

The present disclosure is directed at a method for making an article form a curable material. More particularly, the present disclosure is directed at a method for making a composite article from a fibre-reinforced polymer that includes printing a dissolvable substructure using a three-dimensional printer, and then using the substructure to make the article.

BACKGROUND

Manufacturing using fibre-reinforced polymers, such as carbon fibre-reinforced polymer, is often desirable because of fibre-reinforced polymers' relatively high strength-to-weight ratio and rigidity. Typically, computer numerical control (CNC) machines are used to produce a mold or mandrel with which a composite article can be made using the fibre-reinforced polymer. Given the advantages of manufacturing using fibre-reinforced polymers, research and development continues into methods for more quickly, easily, and inexpensively manufacturing composite articles from fibre-reinforced polymers.

SUMMARY

According to a first aspect, there is provided a method for making an article from a curable material. The method includes printing a dissolvable, three dimensional substructure using a substructure material; applying the curable material to the substructure; curing the curable material while it is on the substructure; and dissolving the substructure using a dissolving agent.

The substructure material may be selected to be dimensionally stable during curing of the curable material. Additionally or alternatively, the substructure material may be selected to have a compressive strength sufficiently high to prevent the substructure material from being crushed during curing of the curable material. Additionally or alternatively, the substructure material may be selected to have a decomposition temperature sufficiently high to prevent the substructure from commencing decomposition during curing of the curable material.

The curable material may be a pliable fibre-reinforced polymer. Applying the curable material to the substructure may involve laying-up the fibre-reinforced polymer on the substructure.

The fibre-reinforced polymer may be cured under pressure.

Applying pressure to the substructure and the fibre-reinforced polymer may involve vacuum bagging the substructure and the fibre-reinforced polymer.

Alternatively or additionally, applying the pressure to the substructure and the fibre-reinforced polymer further may involve placing the substructure and the fibre-reinforced polymer in an autoclave, and pressurizing the autoclave.

Laying-up the fibre-reinforced polymer may involve laying pre-impregnated fibre plies on to the substructure.

Alternatively, laying-up the fibre-reinforced polymer may involve performing a wet lay-up of fibre plies.

The substructure material may be, or incorporate, plaster.

The substructure material may have a decomposition temperature of at least approximately 250° F. (121° C.). The substructure material may also have a decomposition temperature of up to approximately 260° F. (127° C.), 270° F. (132° C.), 280° F. (138° C.), 290° F. (143° C.), 300° F. (149° C.), 310° F. (154° C.), 320° F. (160° C.), 330° F. (166° C.), 340° F. (171° C.), 350° F. (177° C.), 360° F. (182° C.), 370° F. (188° C.), 380° F. (193° C.), or 390° F. (199° C.).

The substructure material may be dimensionally stable on a macroscopic scale when subjected to a temperature up to the decomposition temperature. Additionally or alternatively, the substructure material may be dimensionally stable on a macroscopic scale up to a temperature of approximately 250° F. (121° C.), 260° F. (127° C.), 270° F. (132° C.), 280° F. (138° C.), 290° F. (143° C.), 300° F. (149° C.), 310° F. (154° C.), 320° F. (160° C.), 330° F. (166° C.), 340° F. (171° C.), 350° F. (177° C.), or 360° F. (182° C.).

Printing the substructure may involve including channels in the substructure shaped to facilitate distribution of the dissolving agent throughout the substructure.

The article may be a mold and the method may also include, following dissolving the substructure using the dissolving agent, forming an additional composite article by laying-up the fibre-reinforced polymer on the mold; applying pressure to the mold and the fibre-reinforced polymer sufficient to prevent delamination of the fibre-reinforced polymer during curing; curing the fibre-reinforced polymer while the mold and the fibre-reinforced polymer are subject to the pressure; ceasing applying the pressure to the mold and the fibre-reinforced polymer following curing; and separating the fibre-reinforced polymer from the mold.

Prior to laying-up the fibre-reinforced polymer on the mold, a rubber mat may be formed using the mold. Following laying-up the fibre-reinforced polymer on the mold and prior to applying pressure to the mold and the fibre-reinforced polymer, the rubber mat may be placed on to the fibre-reinforced polymer. Following ceasing applying the pressure to the mold and the fibre-reinforced polymer and prior to separating the fibre-reinforced polymer from the mold, the rubber mat may be removed from the fibre-reinforced polymer. Optionally, the fibre-reinforced polymer may be cured without applying additional pressure, regardless of whether the rubber mat is formed.

According to another aspect, there is provided a method for making a composite article from carbon fibre-reinforced polymer, which includes printing a dissolvable, three dimensional mandrel using a plaster-based material, the material having a decomposition temperature of approximately 390° F. (199° C.), being dimensionally stable between room temperature and the decomposition temperature, and a compressive strength sufficient to prevent the mandrel from crushed when subjected to a gauge pressure of approximately −1 atm; laying-up the carbon fibre-reinforced polymer on the mandrel; subjecting the mandrel and the carbon fibre-reinforced polymer to a vacuum of approximately −1 atm gauge pressure; curing the carbon fibre-reinforced polymer while the mandrel and the carbon fibre-reinforced polymer are subject to the vacuum; ceasing subjecting the mandrel and the carbon fibre-reinforced polymer to the vacuum following curing; and dissolving the mandrel using a dissolving agent.

According to another aspect, there is provided a method for making a composite article from carbon fibre-reinforced polymer, which includes forming a mold and then forming the composite part using the mold. Forming the mold involves printing a dissolvable, three dimensional pattern using a plaster-based material, the material having a decomposition temperature of approximately 390° F. (199° C.), being dimensionally stable between room temperature and the decomposition temperature, and a compressive strength sufficient to prevent the pattern from being crushed when subjected to a gauge pressure of approximately −1 atm; laying-up the carbon fibre-reinforced polymer on the pattern; subjecting the pattern and the carbon fibre-reinforced polymer to a vacuum of approximately −1 atm gauge pressure; curing the carbon fibre-reinforced polymer while the pattern and the carbon fibre-reinforced polymer are subject to the vacuum; ceasing subjecting the pattern and the carbon fibre-reinforced polymer to the vacuum following curing; and dissolving the pattern using a dissolving agent. Forming the composite part involves laying-up the fibre-reinforced polymer on the mold; subjecting the mold and the fibre-reinforced polymer to a vacuum sufficient to prevent delamination of the carbon fibre-reinforced polymer during curing; curing the carbon fibre-reinforced polymer while the mold and the carbon fibre-reinforced polymer are subject to the vacuum; ceasing subjecting the mold and the carbon fibre-reinforced polymer to the vacuum following curing; and separating the carbon fibre-reinforced polymer from the mold.

Any numeric range in this summary includes all additional numeric ranges that are a subset thereof.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more exemplary embodiments.

DETAILED DESCRIPTION

Figure 1:
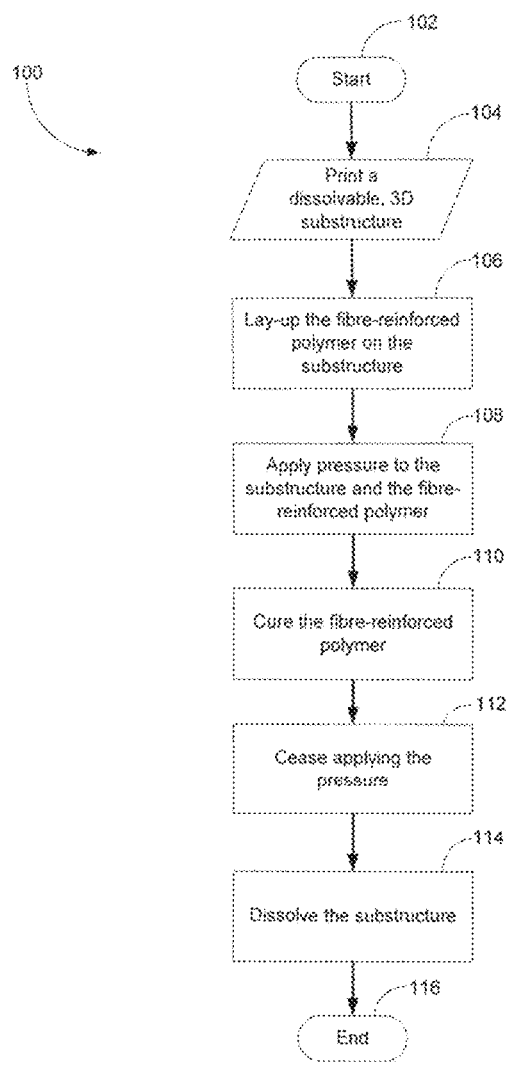
FIG. 1 shows a method for making a composite article from a fibre-reinforced polymer, according to one embodiment.

Directional terms such as "top," "bottom," "upwards," "downwards," "vertically" and "laterally" are used in the following description for the purpose of providing relative reference only, and are not intended to suggest any limitations on how any article is to be positioned during use, or to be mounted in an assembly or relative to an environment.

Manufacturing using composite materials, such as fibre-reinforced polymers (FRPs), is conventionally done using, for example, mandrels and molds that are fabricated using CNC machines. A mandrel is a substructure on to which the composite material is directly placed ("laid-up"), following which the composite material is cured and the mandrel is dissolved, leaving behind a composite article made from the composite material. A mold refers to a composite article on to which the composite material is laid-up and cured, which creates an additional composite article; following curing, the additional composite article and the mold are separated. In contrast with the mandrel, the mold typically can be reused. In these conventional processes, CNC machines can be used to machine the mandrels and molds out of materials such as salt and metal.

One problem with the conventional processes described above is that using CNC machines is expensive, both in terms of labour and capital. Programming the CNC machine, purchasing the materials from which the mold or mandrel will be machined, and operating the CNC machine are relatively expensive because of a combination of the capital cost of the CNC machine, the skilled workers who program and operate the CNC machine, and the length of time the CNC machine takes to machine the mold or mandrel.

Instead of using a CNC machine, the following embodiments utilize a relatively inexpensive three-dimensional (3D) printer to print a dissolvable mandrel or a dissolvable pattern of a mold. While several types of composite materials can be used, such as concrete, the depicted embodiments utilize FRP. The FRP is laid-up and cured on the mandrel to create the composite article. Alternatively, the FRP is laid-up on the dissolvable pattern to create the composite article in the form of a reusable mold, from which one or more additional composite articles can be created. A manufacturer can decide whether to use the mandrel or the mold to manufacture the composite article by considering factors such as the complexity of the article; the number of articles to be produced; and how much time is available to manufacture the article. Manufacturing composite articles by printing dissolvable patterns and mandrels is less expensive and can be done more quickly than the conventional methods involving a CNC machine. The embodiments discussed below can accordingly be used for relatively economical and quick prototyping of parts.

In the following examples, the 3D printer used is a ZPrinter™ printer from 3D Systems Corporation; zpTM130 plaster powder is used as media for the 3D printer; and zbTM58 clear binder solution is used to hold the plaster powder together (collectively, the media and binder solution are hereinafter referred to as "substructure material"). However, as discussed in further detail below, in alternative embodiments different printers may be used, and different powders and binder solutions, which are able to withstand the environmental conditions to which the FRP is subjected during laying-up and curing, may be used as well.

Figure 4:
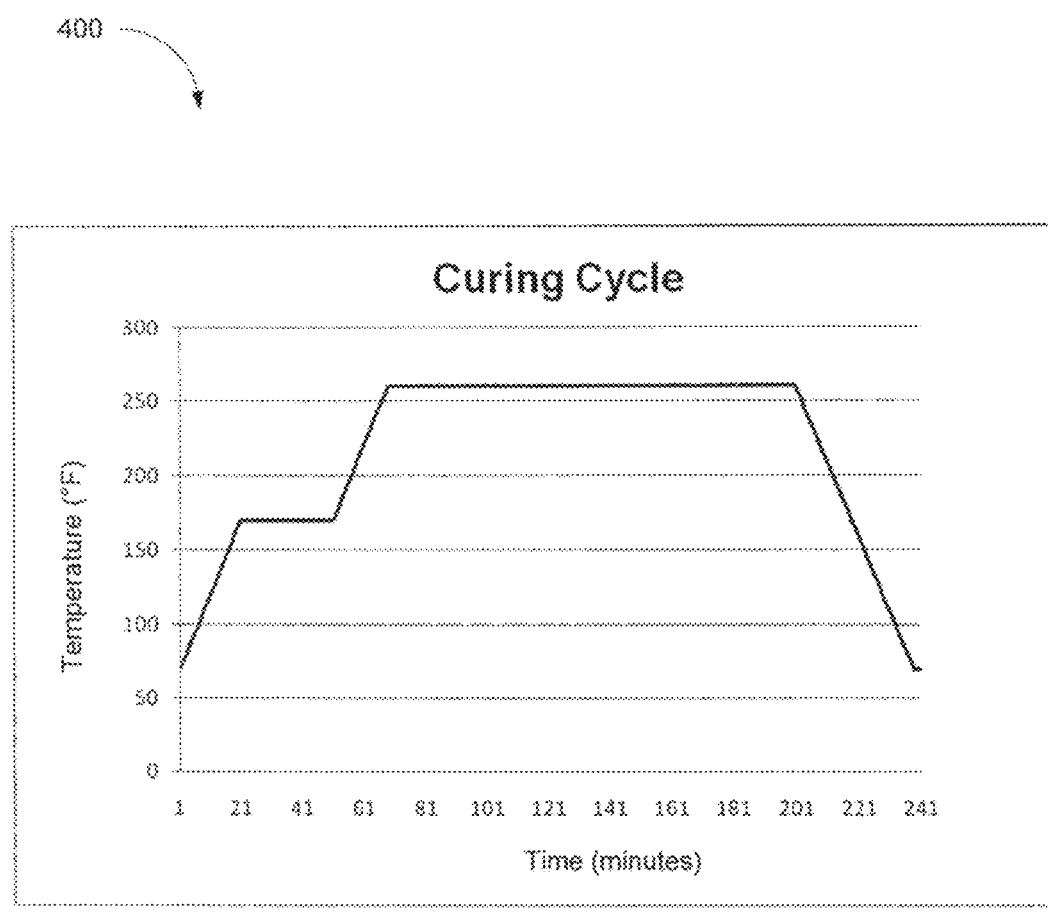
FIG. 4 is a graph of a curing cycle used to cure the pre-impregnated fibre plies, according to another embodiment.

Referring now to FIG. 1, there is shown a method 100 for making a composite article from FRP, according to one embodiment. The method begins at block 102. At block 104, a dissolvable, 3D substructure is printed using a 3D printer. The design for the substructure may be generated in a CAD program such as Solid Edge™ and exported in a format that can be directly sent to the printer, such as a .stl file. The substructure may be a dissolvable mandrel if the composite article to be manufactured is the final composite article that is desired; alternatively, the substructure may be a pattern if the composite article to be manufactured is a mold, from which the final composite article that is desired is to be made. After the substructure is printed, pliable FRP is laid-up on to the substructure at block 106. As discussed in more detail below, a wet lay-up may be performed, or alternatively pre-impregnated ("pre-preg") fibre plies may be used during lay-up. Pressure is then applied to the FRP while it is on the substructure at block 108, and the FRP is cured while under pressure at block 110. When the pre-preg fibre plies are used, the FRP is cured at an elevated temperature; for example, a curing cycle 400 such as that depicted in FIG. 4 may be used. When a wet lay-up is performed, the FRP may be cured at room temperature, which typically is approximately 20° C. (68° F.), although curing may also be done while the FRP is being heated. The pressure applied to the FRP helps to prevent delamination of the fibre plies during curing. After curing, pressure is ceased at block 112, and the substructure is dissolved at block 114 using a suitable dissolving agent. Suitable dissolving agents include, for example, water and muriatic acid.

Figure 6A:
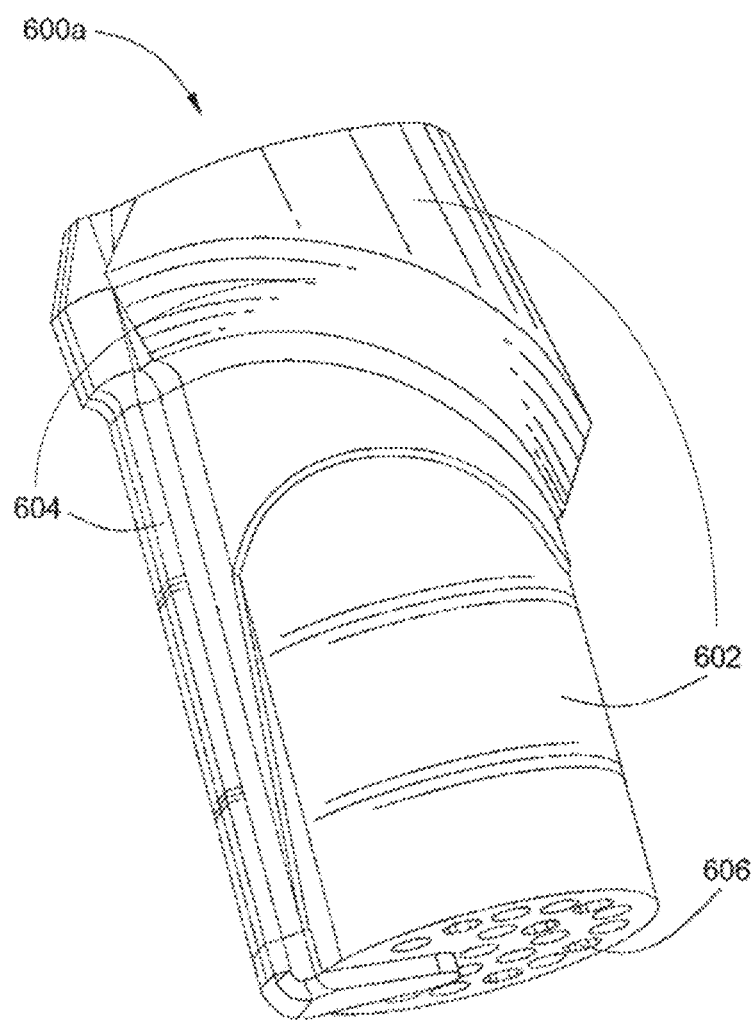
FIG. 6(a) is a perspective view of a dissolvable pattern from which a mold is cast for a water bottle cage, according to another embodiment.
Figure 6B:
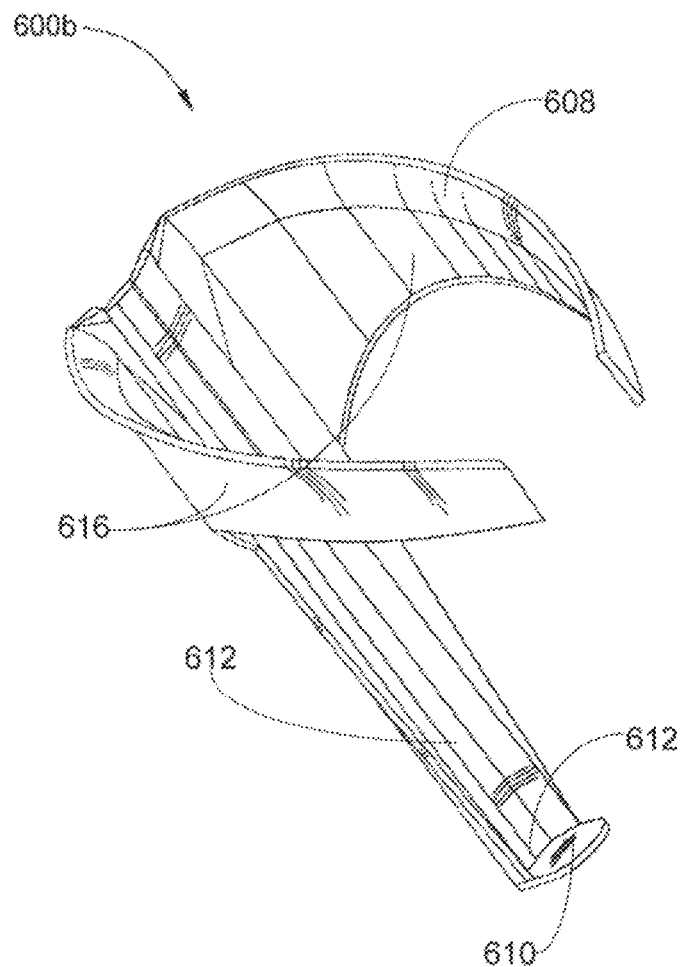
FIG. 6(b) is a perspective view of the water bottle cage cast from the mold made using the dissolvable pattern of FIG. 6(a).
Figure 7A:
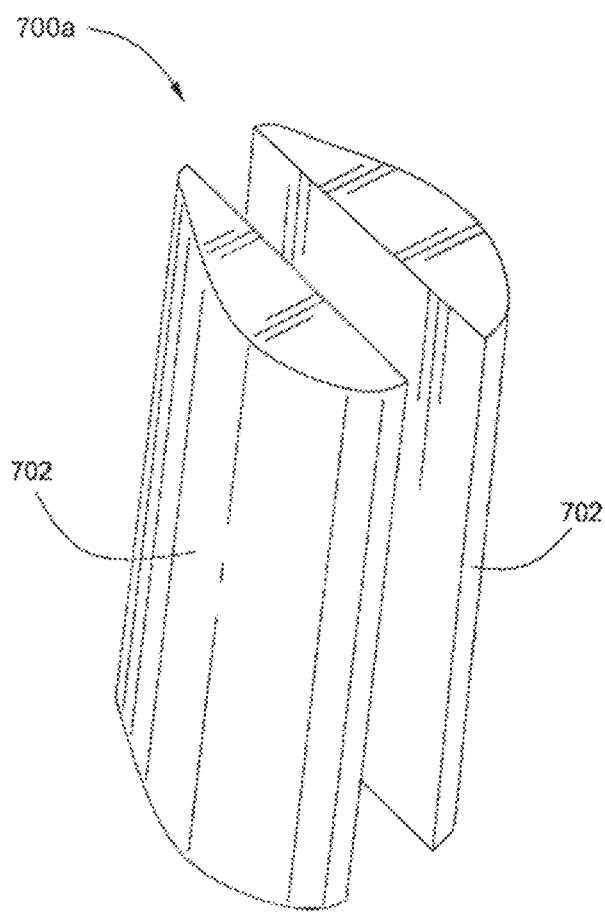
FIG. 7(a) is a perspective view of a dissolvable pattern from which a mold is cast for a bicycle down tube, according to another embodiment.
Figure 7B:
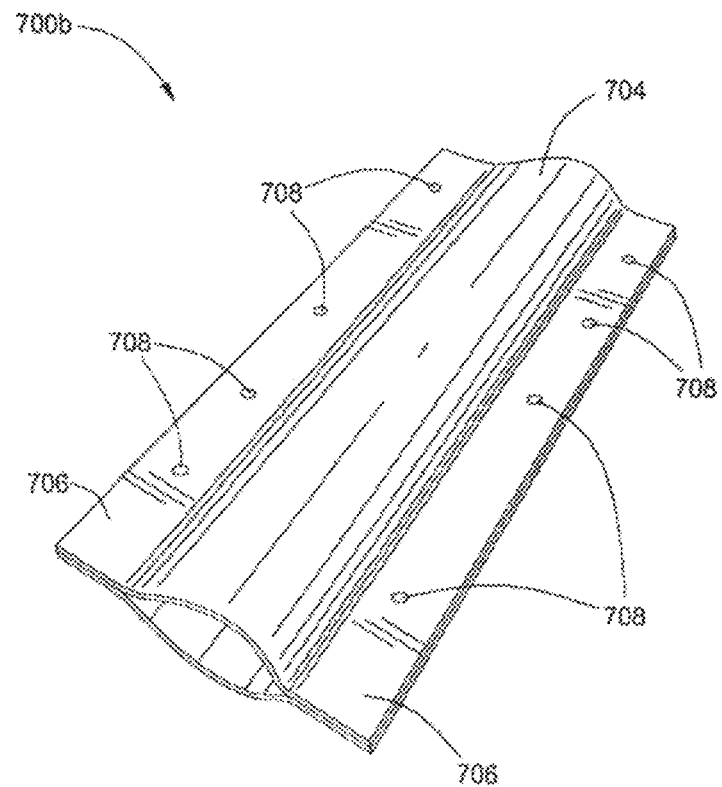
FIG. 7(b) is a perspective view of the mold of the bicycle down tube cast from the dissolvable pattern of FIG. 7(a).
Figure 7C:
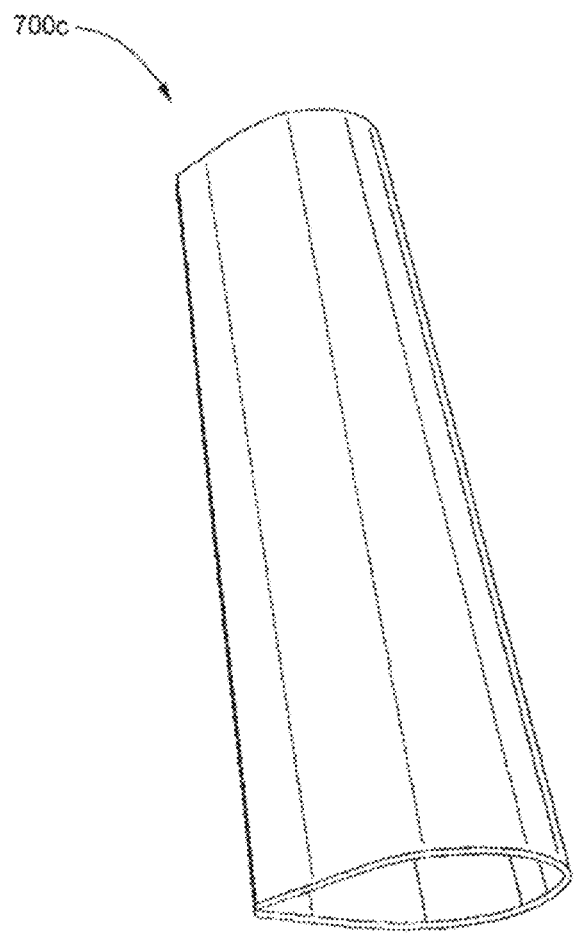
FIG. 7(c) is a perspective view of the down tube manufactured with the mold of FIG. 7(b).

The following three examples, which describe manufacturing of a pair of bicycle handlebars, a water bottle cage 600b (shown in FIG. 6(b)), and a bicycle down tube 700c (shown in FIG. 7(c)) illustrate particular embodiments of the method 100.

Bicycle Handlebars

Figures 2A, 2B:
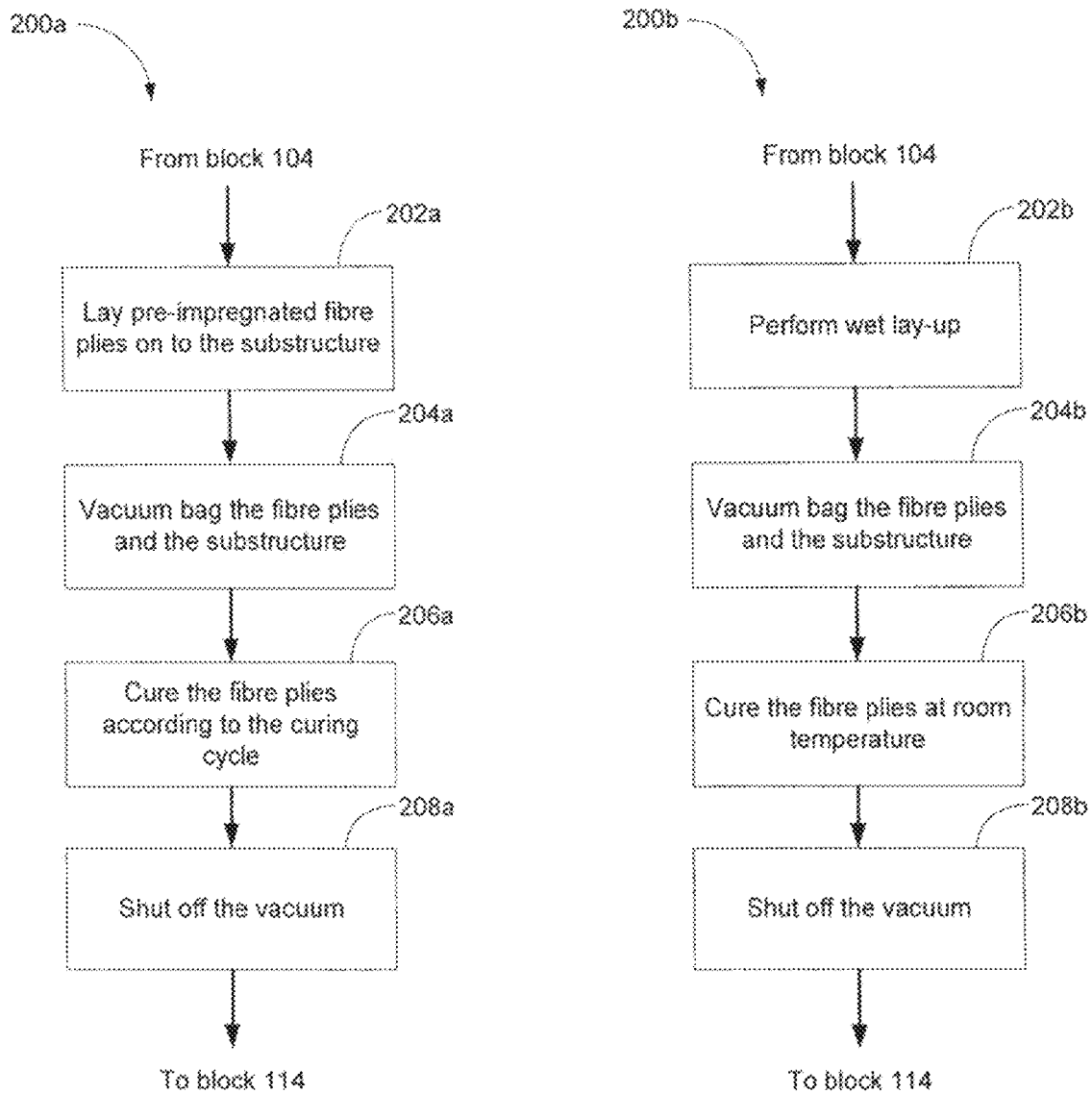
FIG. 2(a) shows a method for laying-up and curing pre-impregnated fibre plies to make the composite article, according to another embodiment.
FIG. 2(b) shows a method for performing a wet lay-up of the fibre-reinforced polymer to make the composite article, according to another embodiment.
Figure 5:
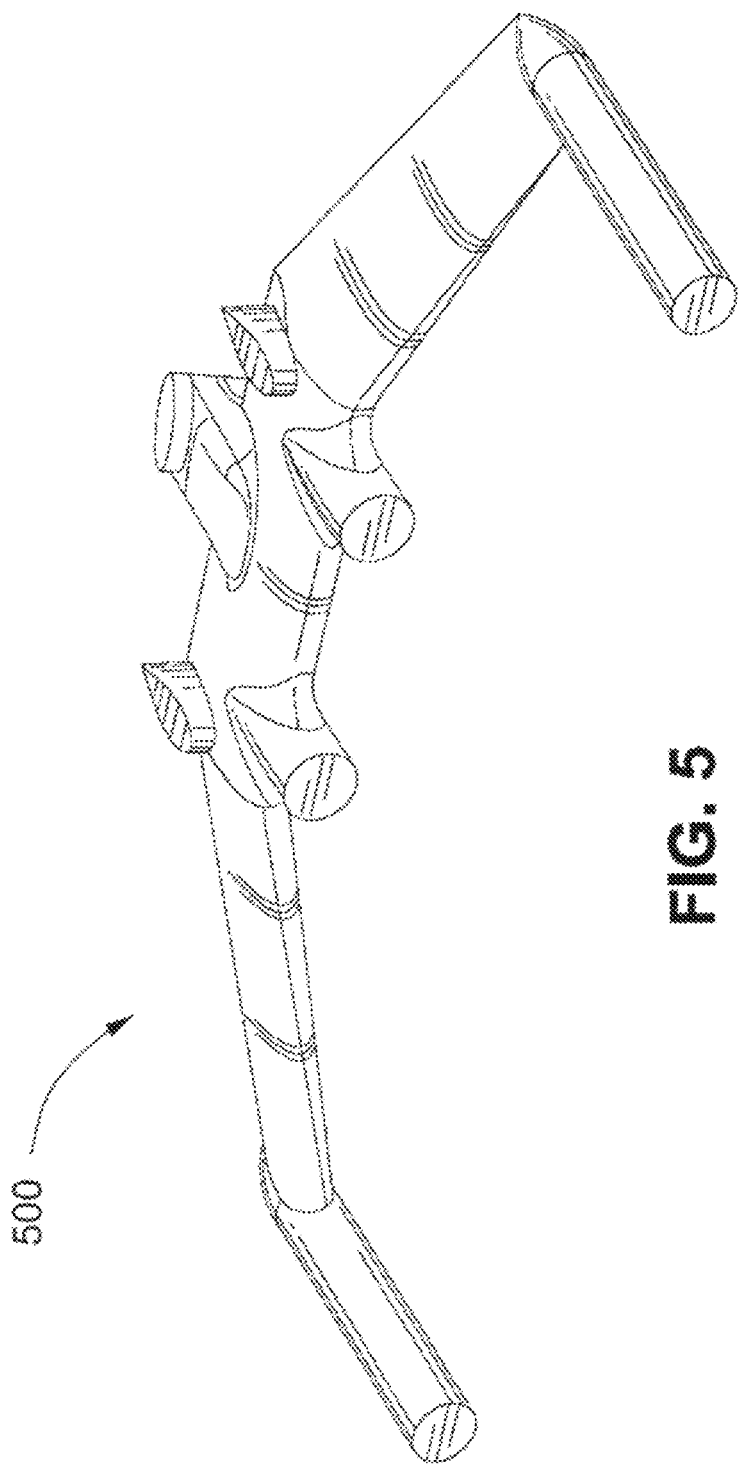
FIG. 5 is a perspective view of a dissolvable mandrel used to make a pair of bicycle handlebars from the pre-impregnated fibre plies, according to another embodiment.

Referring now to FIG. 5, there is shown a perspective view of a mandrel 500 ("handlebars mandrel 500") used to manufacture a composite article in the form of a pair of bicycle handlebars. The handlebars are formed according to the method 100 of FIG. 1, and according to a method 200a for laying-up and curing the pliable FRP (pre-preg fibre plies) as shown in FIG. 2(a), which is a particular embodiment of blocks 104 to 112 of the method 100 of FIG. 1. The handlebars can be manufactured as follows:

(i) The handlebars mandrel 500 is printed using the 3D printer (block 104). The handlebars mandrel 500 can be first designed in a CAD program and then output directly to the 3D printer. The handlebars mandrel 500 is the dissolvable substructure on to which the pre-preg fibre plies will be laid.

(ii) The pre-preg fibre plies are laid-up on to the handlebars mandrel 500 (block 202a). In the depicted embodiment, carbon fibre plies are used. Also in the depicted embodiment, laying-up includes sealing the handlebars mandrel 500 by coating it with an appropriate sealer. For example, the handlebars mandrel 500 may be coated three times with Aquaseal™ 3818 sealer. After the sealer dries and prior to applying the carbon fibre plies, the handlebars mandrel 500 is sanded smooth first with coarse sandpaper and then with fine sand paper.

(iii) The pre-preg fibre plies are vacuum bagged while they are on the handlebars mandrel 500 (block 204a). A strong enough vacuum is drawn such that the gauge pressure within the bag used for vacuum bagging is approximately −20 to −30 inches of water. The vacuum is applied for around 10 minutes. In alternative embodiments, the gauge pressure may approach as high as approximately −1 atm.

(iv) After the vacuum has been applied for around 10 minutes, and while the vacuum is being maintained, the pre-preg fibre plies are cured according to the curing cycle 400 (block 206a). The curing cycle 400 heats the pre-preg fibre plies to approximately 250° F. (121° C.).

(v) After curing is finished, the vacuum is shut off (block 208a).

(vi) The handlebars mandrel 500 and the cured fibre plies are removed from the vacuum bag and the handlebars mandrel 500 is dissolved with water (block 114). A pressure hose can be used to dissolve portions of the handlebars mandrel 500 that initially resist dissolution. After the handlebars mandrel 500 finishes dissolving, only the handlebars remain. The handlebars may be sanded smooth, as desired.

To manufacture the handlebars using a mold, a multi-part mold and an air-filled balloon, which would be inserted into the mold when it is closed, would be used. Using the handlebars mandrel 500 is accordingly simpler than using a mold.

Printing the handlebars mandrel 500 using the 3D printer costs approximately $137: $40 for use of the 3D printer ($10/hour in labour×4 hours), with the costs of the plaster powder and binder solution used with the 3D printer being around $97.23 (486.2 cm³×$0.20/cm³). In contrast, manufacturing a mandrel for the handlebars conventionally using a CNC machine costs approximately $5,560: $960 to program the CNC machine ($60/hour in labour×16 hours), $4,000 for machining ($100/hour×40 hours); and $600 for materials. All dollar figures are Canadian.

Water Bottle Cage 600b

Figure 3:
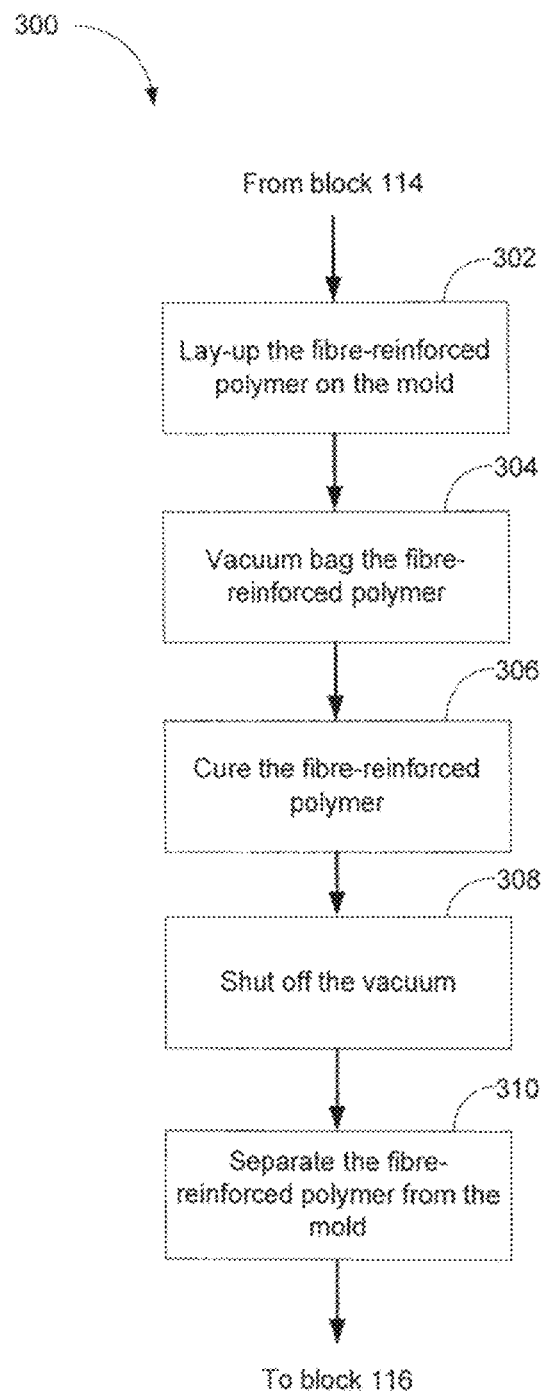
FIG. 3 shows a method in which the composite article that is manufactured using the methods of FIGS. 1, 2(a), and 2(b) is a mold, and in which another composite article is subsequently made using the mold, according to another embodiment.

Referring now to FIGS. 6(a) and 6(b), there are respectively shown a pattern 600a ("cage pattern 600a") for a mold ("cage mold", not shown) of the water bottle cage 600b, and the water bottle cage 600b itself. The cage pattern 600a and the cage mold are formed according to the methods 100, 200a as described for the handlebars, above, and according to an exemplary method 300 for manufacturing a composite article from a mold as shown in FIG. 3. The water bottle cage 600b can be manufactured as follows:

(i) The cage pattern 600a is printed using the 3D printer (block 104). The cage pattern 600a is the dissolvable substructure on to which the pliable FRP (pre-preg fibre plies) are laid; as with the handlebars, carbon fibres are used, but different fibre types may be used in alternative embodiments. The cage pattern 600a includes a lay-up surface 604, on to which the pre-preg fibre plies are laid-up to make the cage mold, and a bare surface 602, on to which none of the pre-preg fibre plies is placed. The lay-up surface 604 corresponds to the surface of the cage mold. Extending along the length of the cage pattern 600 through portions of the bare surface 602 are channels 606 that facilitate the cage pattern 600a's dissolution by distributing water throughout the cage pattern 600a, as discussed below.

(ii) 20 of the pre-preg fibre plies are laid-up on to the lay-up surface 604 (block 202a). As with the handlebars, the lay-up surface 604 is sealed with an appropriate sealer prior to applying the fibre plies; the cage pattern 600a may be coated three times with Aquaseal™ 3818 sealer. The lay-up surface 604 is sanded smooth after every coat of the sealer.

(iii) The cage pattern 600a and the pre-preg fibre plies are vacuum bagged (block 204a). A strong enough vacuum is drawn such that the gauge pressure within the bag used for the vacuum bagging is approximately −20 to −30 inches of water; in alternative embodiments, the gauge pressure may approach as high as approximately −1 atm.

(iv) While maintaining the vacuum, the pre-preg fibre plies are cured according to the curing cycle 400 (block 206a).

(v) Following curing, the vacuum is shut off (block 208a).
(vi) The cured fibre plies and the cage pattern 600a are removed from the vacuum bag and the cage pattern 600a is dissolved by submerging it in water (block 114). The cured fibre plies that remain after the pattern 600a is dissolved are the cage mold. The cage mold includes a backing 612 and a pair of wings 616 that extend outwardly from the backing 612. Lining the top of each of the wings 616 is a flange 608 that helps prevent a vacuum bag from being pushed between the fibre plies and the cage mold when the cage mold is being used to cast the water bottle cage 600b itself. A tab 610 extends orthogonally from the bottom of the backing 612, and the radius of curvature of a connection point 612 between the tab 610 and the backing 612 is sufficiently large to allow the fibre plies laid-up on the cage mold to adhere snugly to the connection point 612.
(vii) The edges of the cage mold are trimmed as desired, and the inside surface of the cage mold is sanded to a smooth finish.
(viii) The surface of the cage mold is coated with a graphite filled surface coat resin, such as TMSF 5001A/TMH 5001B resin. This resin is used to create a smooth surface on the cage mold on to which the pre-preg fibre plies for the water bottle cage 600b can be laid-up.
(ix) The cage mold is cured at 200° F. (93.3° C.) for approximately 30 minutes.
(x) The surface of the cage mold is sanded with fine sand paper.
(xi) The surface of the cage mold is coated with a suitable mold release agent, such as Frekote™ mold release agent.
(xii) Cure the mold at 200° F. (93.3° C.) for half an hour.
(xiii) A rubber mat is made using the surface of the cage mold. The rubber mat can be made from a high temperature casting compound such as the Aircast™ 3700 A/B compound. The rubber mat is applied over the pre-preg fibre plies used to manufacture the water bottle cage 600b so that the water bottle cage 600b has a smooth finish.
(xiv) The surface of the cage mold is cleaned with acetone.
(xv) The surface of the cage mold is again coated with a suitable mold release agent, such as Frekote™ mold release agent.
(xvi) The pre-preg fibre plies are laid-up on to the inner surface of the cage mold (block 302). The inner surface of the cage mold is the surface between the cage mold's wings.
(xvii) Any excess pre-preg fibre plies that extend past the edges of the cage mold are trimmed away.
(xviii) The pre-preg fibre plies are covered with the rubber mat.
(xix) The cage mold and the laid-up pre-preg fibre plies are vacuum bagged for approximately 10 minutes (block 304). A strong enough vacuum is drawn such that the gauge pressure within the bag used for vacuum bagging is approximately −1 atm.
(xx) While maintaining the vacuum, the pre-preg fibre plies are cured according to the curing cycle 400 (block 306).
(xxi) Following curing, the vacuum is shut off (block 308) and the water bottle cage 600b, the rubber mat, and the cage mold are separated from each other (block 310).
(xxii) The water bottle cage 600b is trimmed, sanded, and glazed, as desired.

Creating the mold using the 3D printer costs approximately $270: $40 for use of the 3D printer ($10/hour in labour×4 hours); $63.51 for the plaster powder and binder solution used with the 3D printer (317.5 cm$^3$×$0.20/cm$^3$); $120 to make the mold ($15/hour in labour×8 hours); and $46.93 for the pre-preg carbon fibre plies (6.67 ft$^2$×$7.04/ft$^2$). In contrast, manufacturing a mold for the water bottle cage 600b using a CNC machine costs approximately $4,860: $960 to program the CNC machine ($60/hour in labour×16 hours), $3,600 for machining ($100/hour×36 hours); and $300 for materials. All dollar figures are Canadian.

Bicycle Down Tube

Referring now to FIGS. 7(*a*) to (*c*), there are respectively shown a pattern 700a ("down tube pattern 700a") for a mold 700b ("down tube mold 700b") for the bicycle down tube 700c, the down tube mold 700b itself, and the down tube 700c itself. The down tube pattern 700a, down tube mold 700b, and down tube 700c are formed according to the methods 100,300 described above, and according to a method 200b for performing a wet lay-up and the subsequent curing of carbon fibre and high temperature laminating resin, as shown in FIG. 2(*b*). The down tube 700c can be manufactured as follows:

(i) The down tube pattern 700a is printed using the 3D printer (block 104). The down tube pattern 700a is the dissolvable substructure on to which the mats of pliable carbon fibre and high temperature laminating resin will be laid-up; this wet lay-up differs from using the pre-preg fibre plies described above in respect of the handlebars and water bottle cage 600b The down tube pattern 700a has two halves that are distinct from and bilaterally symmetric relative to each other. Each of the down tube pattern 700a's halves includes a cambered surface 702, on to which the carbon fibre will be laid-up.

(ii) The flat side of each the down tube pattern 700a's halves is placed on an aluminum plate and the carbon fibre and high temperature laminating resin are laid-up on to the cambered surfaces 702 of the down tube pattern 700a (block 202b). 20 layers of the carbon fibre are used during lay-up. Some of the carbon fibre is laid-up past the edges of the pattern 700a so that the halves of the down tube mold 700b created using the down tube pattern 700a include longitudinally extending flanges 706. As with the handlebars and the water bottle cage 600b, in the depicted embodiment laying-up includes sealing the cambered surface 702 of each of the down tube pattern 700a's halves with an appropriate sealer prior to applying the carbon fibre; the cambered surfaces 702 may each be coated three times with Aquaseal™ 3818 sealer, and sanded smooth after every application of each coat of the sealer. Additionally, in the depicted embodiment laying-up also includes coating the cambered surfaces 702 of the down tube pattern 700a's halves with a graphite filled surface coat resin, such as TMSF 5001A/TMH 5001B resin, after applying the sealer and prior to applying the carbon fibre. This resin is used to create a smooth surface on the down tube pattern 700a on to which the carbon fibre and resin can be laid-up.

(iii) The down tube pattern 700a and the carbon fibre are vacuum bagged such that the gauge pressure within the bag used for vacuum bagging is approximately −20 to −30 inches of water (block 204b). In alternative embodiments, the gauge pressure may approach as high as approximately −1 atm.

(iv) The carbon fibre and the resin are cured at room temperature (approximately 20° C. [68° F.]) while under vacuum (block 206*b*).
(v) Following curing, the vacuum is shut off (block 208*b*).
(vi) The down tube pattern is dissolved in 700*a* in water (block 114).
(vii) The down tube mold 700*b* that remains after dissolution of the down tube pattern 700*a* is a two-part mold that, like down tube pattern 700*a*, includes two halves that are bilaterally symmetric to each other. The edges of the flanges 706 are sanded so they are not sharp, and bolt holes 708 are drilled through the flanges 706 so that the down tube mold 700*b*'s two halves can be screwed together to form a cambered chamber 704 on to the interior of which carbon fibre can be laid-up to form the down tube 700*c*.
(viii) The interior of the cambered chamber 704 is coated with a suitable mold release agent, such as Frekote™ mold release agent.
(ix) A wet lay-up is performed on the interior of the cambered chamber 704 using carbon fibre plies (block 302). The fibre plies are applied to the two halves of the down tube mold 700*b* so that they overlap with each other along the edges of the cambered chamber 704 that are connected to the flanges 706, which results in the down tube 700*c* being sealed along its edges. Following lay-up, the two halves of the down tube mold 700*b* are clamped together by threading fasteners (not shown) through the bolt holes 708.
(x) The down tube mold 700*b* and the laid-up carbon fibre plies are vacuum bagged (block 304). A strong enough vacuum is drawn such that the gauge pressure within the bag used for vacuum bagging is approximately −20 to −30 inches of water; in alternative embodiments, the gauge pressure may approach as high as approximately −1 atm.
(xi) The carbon fibre and resin are cured at room temperature (approximately 20° C. [68° F.]) while under vacuum (block 306).
(xii) Following curing, the vacuum is shut off (block 308).
(xiii) The two halves of the down tube mold 700*b* are separated from each other, and the cured carbon fibre is removed from the interior of the cambered chamber 704 (block 310).
(xiv) The edges of the cured carbon fibre are trimmed and sanded as desired to result in the down tube 700*c*.

Creating the mold 700*b* using the 3D printer costs approximately $367: $40 for use of the 3D printer ($10/hour in labour×4 hours); $63.51 for the plaster powder and binder solution used with the 3D printer (317.5 cm³×$0.20/cm³); $90 to make the mold ($15/hour in labour×6 hours); and $173.33 for the carbon fibre ($3.12/ft²×55.56 ft²). In contrast, manufacturing a mold for the water bottle cage 600*b* using a CNC machine costs approximately $2,440: $240 to program the CNC machine ($60/hour in labour×4 hours), $1,600 for machining ($100/hour×16 hours); and $600 for materials. All dollar figures are Canadian.

Pre-preg fibre plies are used when manufacturing the handlebars and the water bottle cage 600*b*, and wet lay-ups are performed when manufacturing the down tube 700*c*. However, in alternative embodiments wet lay-ups can be performed in place of using pre-preg fibre plies and vice-versa, as desired. Additionally, while carbon FRP is used to construct the handlebars, water bottle cage 600*b*, and down tube 700*c*, in alternative embodiments different types of FRP may be used. Suitable types of FRP include, for example, those that incorporate Kevlar™ fibres, chopped strand mat, or polyester resins; however, a skilled person will appreciate that other types and combinations of fibres and polymers may also be used.

Furthermore, in the embodiments discussed above, the handlebars mandrel 500, the cage and down tube patterns 600*a*,700*a*, and the cage mold and down tube mold 700*b* are vacuum bagged. However, in alternative embodiments an autoclave, clamps, or any other suitable device may be used to apply pressure to the mandrel 500, patterns 600*a*,700*a*, cage mold and down tube mold 700*b*. In an embodiment in which the autoclave is used, pressure may be increased well in excess of the 1 atm possible with vacuum bagging; for example, pressure may be increased up to around 100 psi. In other alternative embodiments, curing may be done without applying any additional pressure at all.

As discussed above, the handlebars mandrel 500 and the cage and down tube patterns 600*a*,700*a* are printed using zp™130 plaster powder and zb™58 clear binder solution. However, in alternative embodiments different media and binder solutions may be used so long as they each have a sufficiently high decomposition temperature to withstand curing of the FRP; sufficiently high compressive strength to withstand the pressure applied to them during curing; and are dimensionally stable over the temperatures at which the FRP cures so that the FRP has a stable surface on which to cure. The suitability of the substructure material was tested by being used to print a test substructure, and by then performing the following tests on the test substructure.

To test decomposition temperature, the test substructure was coated with an appropriate sealer, such as Aquaseal™ 3818 sealer. The test substructure was then heated in an oven and was observed to see at what temperature it began to decompose. At 390° F. (199° C.), the edges of the test substructure began to burn. The zp™130 plaster powder and zb™58 binder solution are accordingly suitable to print substructures for curing at temperatures up to approximately 390° F. (199° C.).

To test compressive strength, the test substructure was subjected to the pressures that are applied to it during curing of the FRP. As vacuum bagging is used during curing of the handlebars, water bottle cage 600*b*, and down tube 700*c*, the test substructure was vacuum bagged for the duration of the curing cycle 400 and for the 10 minutes that the FRP is vacuum bagged prior to curing. No evidence of structural degradation in the form of cracking or disintegration, for example, of the test substructure was observed. The zp™130 plaster powder and zb™58 binder solution are accordingly suitable to print substructures when pressure is applied via vacuum bagging.

To test dimensional stability, the dimensions of the test substructure were measured at room temperature (approximately 68° F. [20° C.]) using a pair of callipers, and the test substructure was then placed into an oven and heated. At 360° F. (182° C.) no change in the substructure's dimensions were observable on a macroscopic scale; i.e. the test substructure was measured again using the callipers, and no change relative to the test substructure's dimensions at room temperature was observed. The test substructure was heated until it reached approximately 390° F. (199° C.) and began to decompose.

Analogous tests can be performed on other types of media and binder solutions to determine their suitability for use in the methods described herein.

In the foregoing embodiments, the FRP is cured at a temperature below the decomposition temperature of the substructure material so that the substructure does not begin to decompose during curing. The FRP is also cured at a pressure that exerts a force on the substructure that the substructure material can withstand; i.e., the compressive strength of the substructure material is sufficiently high that the substructure is not crushed during curing. Additionally, the FRP is cured in a temperature range in which the substructure material is dimensionally stable. Consequently, in the foregoing embodiments the state of the substructure remains relatively constant during curing.

In alternative embodiments, any one or more of the decomposition temperature, compressive strength, and coefficient of expansion of the substructure material may be selected so that the substructure's state is not constant during curing but also so that a usable composite article is nonetheless produced. For example, if curing occurs at a temperature that exceeds the substructure material's decomposition temperature, the substructure may begin to smolder but may retain sufficient structural stability for enough of the curing process that the composite article is successfully manufactured. Similarly, if the substructure is dimensionally unstable during curing or if the pressure partially crushes the substructure during curing, the dimensions of the composite article that the substructure is used to produce may not conform to precise tolerances but the composite article may nonetheless be useful.

Furthermore, in the foregoing embodiments FRP is the composite material that is used. However, in alternative embodiments different curable materials, including those that are not composite materials, may be used. For example, certain polymers, such as the Aircast™ 3700 A/B compound discussed in connection with the water bottle cage 600b may be cured to form the article. In another alternative embodiment, non-pliable composite materials may be used; for example, concrete may be applied using a hand or trowel to the mold or mandrel, following which it may be cured to form a concrete article.

It is contemplated that any part of any aspect or embodiment discussed in this specification can be implemented or combined with any part of any other aspect or embodiment discussed in this specification.

While particular embodiments have been described in the foregoing, it is to be understood that other embodiments are possible and are intended to be included herein. It will be clear to any person skilled in the art that modifications of and adjustments to the foregoing embodiments, not shown, are possible.

The invention claimed is:

1. A method for making an article and a composite article, the method comprising:
   (a) printing a dissolvable, three dimensional substructure using a substructure material;
   (b) applying a curable material to the substructure;
   (c) curing the curable material while it is on the substructure; and
   (d) dissolving the substructure using a dissolving agent,
   wherein the curable material comprises a pliable fibre-reinforced polymer, and wherein applying the curable material to the substructure comprises laying-up the fibre-reinforced polymer on the substructure,
   wherein the article is a mold and further comprising, following dissolving the substructure using the dissolving agent, forming the composite article by:
   (i) laying-up additional pliable fibre-reinforced polymer on the mold;
   (ii) curing the additional fibre-reinforced polymer on the mold; and
   (iii) separating the additional fibre-reinforced polymer from the mold.

2. A method as claimed in claim 1 wherein the substructure material is selected to be dimensionally stable during curing of the curable material.

3. A method as claimed in any one of claims 1 and 2 wherein the substructure material is selected to have a compressive strength sufficiently high to prevent the substructure material from being crushed during curing of the curable material.

4. A method as claimed in any one of claims 1 to 3 wherein the substructure material is selected to have a decomposition temperature sufficiently high to prevent the substructure from commencing decomposition during curing of the curable material.

5. A method as claimed in any one of claims 1 to 4 further comprising:
   (a) after laying-up and prior to curing the fibre-reinforced polymer used to make the mold, applying pressure to the substructure and the fibre-reinforced polymer used to make the mold; and
   (b) after curing and prior to dissolving the substructure, ceasing to apply pressure to the substructure and the fibre-reinforced polymer used to make the mold.

6. A method as claimed in claim 5 wherein applying the pressure to the substructure and the fibre-reinforced polymer used to make the mold comprises vacuum bagging the substructure and the fibre-reinforced polymer used to make the mold.

7. A method as claimed in any one of claims 5 and 6 wherein applying the pressure to the substructure and the fibre-reinforced polymer used to make the mold further comprises placing the substructure and the fibre-reinforced polymer used to make the mold in an autoclave, and pressurizing the autoclave.

8. A method as claimed in any one of claims 1 to 4 and 5 to 7 wherein laying-up the fibre-reinforced polymer used to make the mold comprises laying pre-impregnated fibre plies on to the substructure.

9. A method as claimed in any one of claims 1 to 4 and 5 to 7 wherein laying-up the fibre-reinforced polymer used to make the mold comprises performing a wet lay-up of fibre plies.

10. A method as claimed in any one of claims 1 to 4 and 5 to 9 wherein the substructure material comprises plaster.

11. A method as claimed in claim 10 wherein the substructure material has a decomposition temperature of at least approximately 250° F. (121° C.).

12. A method as claimed in claim 11 wherein the substructure material has a decomposition temperature of up to approximately 390° F. (199° C.).

13. A method as claimed in any one of claims 10 to 12 wherein the substructure material is dimensionally stable on a macroscopic scale when subjected to a temperature up to the decomposition temperature.

14. A method as claimed in claim 13 wherein the substructure material is dimensionally stable on a macroscopic scale up to a temperature of at least approximately 360° F. (182° C.).

15. A method as claimed in any one of claims 1 to 4 and 5 to 10 wherein printing the substructure comprises including channels in the substructure shaped to facilitate distribution of the dissolving agent throughout the substructure.

16. A method as claimed in claim 1 further comprising:
   (a) prior to laying-up the additional fibre-reinforced polymer on the mold, forming a rubber mat using the mold;
   (b) following laying-up the additional fibre-reinforced polymer on the mold and prior to separating the additional fibre-reinforced polymer from the mold, placing the rubber mat on to the additional fibre-reinforced polymer; and (c) following curing the additional fibre-reinforced polymer and prior to separating the additional fibre-reinforced polymer from the mold, removing the rubber mat from the additional fibre-reinforced polymer.

* * * * *